(12) United States Patent
Ghosh

(10) Patent No.: US 8,825,631 B2
(45) Date of Patent: Sep. 2, 2014

(54) SYSTEM AND METHOD FOR IMPROVED PROCESSING OF AN SQL QUERY MADE AGAINST A RELATIONAL DATABASE

(75) Inventor: Sudipta Ghosh, Kolkata (IN)

(73) Assignee: Wipro Limited, Bangalore (IN)

( * ) Notice: Subject to any disclaimer, the term of this patent is extended or adjusted under 35 U.S.C. 154(b) by 73 days.

(21) Appl. No.: 13/593,515

(22) Filed: Aug. 24, 2012

(65) Prior Publication Data
US 2013/0262432 A1 Oct. 3, 2013

(30) Foreign Application Priority Data

Mar. 27, 2012 (IN) ............................ 1158/CHE/2012

(51) Int. Cl.
*G06F 17/30* (2006.01)
(52) U.S. Cl.
USPC ......................................................... 707/713
(58) Field of Classification Search
USPC .................... 707/3, 779, 713; 709/204–206
See application file for complete search history.

(56) References Cited

U.S. PATENT DOCUMENTS

| 6,304,871 B1 * | 10/2001 | Gajda et al. ............................ 1/1 |
| 7,653,652 B2 * | 1/2010 | Kagalwala et al. .... 707/999.103 |
| 7,904,472 B1 * | 3/2011 | Karnik .......................... 707/779 |
| 2005/0097091 A1 * | 5/2005 | Ramacher et al. ................ 707/3 |

* cited by examiner

*Primary Examiner* — Etienne Leroux
(74) *Attorney, Agent, or Firm* — LeClairRyan, a Professional Corporation

(57) ABSTRACT

A system and method for improved processing of an SQL query made against a relational database is disclosed. In one example embodiment, the method includes parsing the SQL query, received against the relational database, to obtain each operator and associated one or more operands and sequence of execution of the operators. Further, it is determined whether all needed closure-friendly operators exist. Furthermore, any available closure-friendly operators are obtained from a pattern repository if all needed closure-friendly operators do not exist. In addition, remaining or all non-available closure-friendly operators are dynamically generated. Moreover, the available closure-friendly operators and the dynamically generated closure-friendly operators are grouped into one or more patterns and impact of each pattern on a queried relational database and a database schema is classified. Also, the SQL query is executed using the one or more patterns based on sequence of the execution of the operators.

15 Claims, 10 Drawing Sheets

QUERY Q3 : SELECT A FROM R WHERE A>5
                              └─202         └──┘
                               ▼              204
RELATION Q1_W (RELATION R)

...// CODE OMITTED

IF r ["A"] > 5

ADD r TO RESULT

...// CODE OMITTED

RETURN RESULT

| O/P→ I/P↓ | FROM | | | WHERE | | | GROUP | | | SELECT | | |
|---|---|---|---|---|---|---|---|---|---|---|---|---|
| | $D$ | $D^+$ | $D^U$ | $D$ | $D^+$ | $D^U$ | $D$ | $D^+$ | $D^U$ | $D$ | $D^+$ | $D^U$ |
| $D$ | X | X | X | X | X | - | X | X | X | X | X | X |
| $D^+$ | X | X | X | X | X | - | X | X | X | X | X | X |
| $D^U$ | X | X | X | - | - | X | X | X | X | X | X | X |

— 300B

| OPERATOR | PATTERN | CLOSED? | REMARKS |
|---|---|---|---|
| FROM | P(D)→D | YES | THE INPUT HAS JUST ONE RELATION, OR THE RESULT IS A COPY OF A RELATION IN D. |
| | P(D)→D⁺ | NO | THE INPUT HAS MORE THAN ONE RELATION. THE RESULT IS UNION-COMPATIBLE WITH A RELATION IN D. |
| | P(D)→D^U | NO | THE INPUT HAS MORE THAN ONE RELATION AND THE RESULT IS NOT UNION-COMPATIBLE WITH ANY RELATION IN D. |
| FROM | P(S)→S | YES | THE INPUT SET MIGHT CONTAIN JUST ONE RELATION, OR THE RESULT MIGHT BE A COPY OF A RELATION IN D, OR THE RESULT IS OTHERWISE UNION-COMPATIBLE WITH A RELATION IN D. |
| | P(S)→S^U | NO | THE INPUT HAS MORE THAN ONE RELATION AND THE RESULT IS NOT UNION-COMPATIBLE WITH ANY RELATION IN D. |
| WHERE | D→D | YES | THE FILTER IS NOT SELECTIVE, OR A HORIZONTAL PARTITION OF THE INPUT RELATION IS A COPY OF ANOTHER RELATION IN D. |
| | D→D⁺ | NO | THE FILTER IS SELECTIVE. NO RELATION IN D IS A COPY OF ANY HORIZONTAL PARTITION OF THE INPUT RELATION. |
| WHERE | S→S | YES | A WHERE FUNCTION CANNOT ALTER SCHEMA. |
| GROUP | D→D | YES | THE GROUPING IS INEFFECTIVE, OR THE RESULT IS A COPY OF A RELATION IN D. IN PRACTICE, THE LATTER CASE ARISES WHEN A "SUMMARY RELATION" IS USED TO EASE REPORTING AND OTHER OPERATIONS, COMMONLY IN A DATA WAREHOUSE SETTING. |
| | D→D⁺ | NO | THE GROUPING IS EFFECTIVE. IF A SUMMARY RELATION IS IN USE, THE RESULT IS LIKELY USED TO UPDATE THE SUMMARY. |
| | D→D^U | NO | THE GROUPING IS EFFECTIVE, BUT NO SUMMARY RELATION IS IN USE. |
| GROUP | S→S | YES | THE GROUPING MAY OR MAY NOT BE EFFECTIVE. |
| | S→S^U | NO | THE GROUPING IS EFFECTIVE. |
| SELECT | D→D | YES | THE OUTPUT ATTRIBUTE LIST IS *, THE OUTPUT IS A VERTICAL PARTITION OF THE INPUT AND THE PARTITION COPIES A RELATION IN D, OR A VERTICAL PARTITION OF THE INPUT ALONG WITH ANY CONSTANTS AND AGGREGATES IN THE OUTPUT COPIES A RELATION IN D. |
| | D→D⁺ | NO | THE OUTPUT ATTRIBUTES CREATE A VERTICAL PARTITION OF THE INPUT AND THE PARTITION SHARES SCHEMA WITH A RELATION IN D, OR A VERTICAL PARTITION OF THE INPUT ALONG WITH ANY CONSTANTS AND AGGREGATES IN THE OUTPUT SHARES SCHEMA WITH A RELATION IN D. |
| | D→D^U | NO | THE OUTPUT ATTRIBUTE LIST IS NOT *. NO VERTICAL PARTITON OF THE INPUT, AUGMENTED BY CONSTANTS AND AGGREGATES IN THE OUTPUT, SHARES SCHEMA WITH A RELATION IN D. |
| SELECT | S→S | YES | THE RESULT IS UNION-COMPATIBLE WITH A RELATION IN D. |
| | S→S^U | NO | THE RESULT IS NOT UNION-COMPATIBLE WITH ANY RELATION IN D. |

FIG. 6

| OPERATOR | PATTERN | REMARKS |
|---|---|---|
| FROM | $P(D^+) \rightarrow D$ | THE INPUT HAS MORE THAN ONE RELATION. THE OUTPUT IS A COPY OF A RELATION IN D. |
| | $P(D^+) \rightarrow D^+$ | THE OUTPUT IS UNION-COMPATIBLE WITH A RELATION IN D. |
| | $P(D^+) \rightarrow D^U$ | THE INPUT HAS MORE THAN ONE RELATION. THE OUTPUT IS NOT UNION-COMPATIBLE WITH ANY RELATION IN D. |
| | $P(D^U) \rightarrow D$ | THE INPUT HAS MORE THAN ONE RELATION. THE OUTPUT IS A COPY OF A RELATION IN D. |
| | $P(D^U) \rightarrow D^+$ | THE INPUT HAS MORE THAN ONE RELATION. THE OUTPUT IS UNION-COMPATIBLE WITH A RELATION IN D. |
| | $P(D^U) \rightarrow D^U$ | THE RESULT IS NOT UNION-COMPATIBLE WITH ANY RELATION IN D. |
| FROM | $P(S^U) \rightarrow S$ | THE INPUT HAS MORE THAN ONE RELATION. THE RESULT IS A COPY OF A RELATION IN D OR IT IS UNION-COMPATIBLE WITH A RELATION IN D |
| | $P(S^U) \rightarrow S^U$ | THE RESULT IS NOT UNION-COMPATIBLE WITH ANY RELATIN IN D. |
| WHERE | $D^+ \rightarrow D$ | THE FILTER IS SELECTIVE AND THE RESULT IS A COPY OF A RELATION IN D |
| | $D^+ \rightarrow D^+$ | THE RESULT IS UNION-COMPATIBLE WITH A RELATION IN D |
| | $D^U \rightarrow D^U$ | THE RESULT IS NOT UNION-COMPATIBLE WITH ANY RELATION IN D |
| WHERE | $S^U \rightarrow S^U$ | A WHERE FUNCTION CANNOT ALTER SCHEMA. |
| GROUP | $D^+ \rightarrow D$ | THE GROUPING IS EFFECTIVE. THE RESULT IS A COPY OF A RELATION IN D |
| | $D^+ \rightarrow D^+$ | THE GROUPING IS POSSIBLY INEFFECTIVE. THE RESULT IS NOT UNION-COMPATIBLE WITH A RELATION IN D |
| | $D^+ \rightarrow D^U$ | THE GROUPING IS EFFECTIVE. THE RESULT IS NOT UNION-COMPATIBLE WITH ANY RELATION IN D |
| | $D^U \rightarrow D$ | THE GROUPING IS EFFECTIVE. THE RESULT IS A COPY OF A RELATION IN D |
| | $D^U \rightarrow D^+$ | THE GROUPING IS EFFECTIVE. THE RESULT IS UNION-COMPATIBLE WITH A RELATION IN D |
| | $D^U \rightarrow D^U$ | THE GROUPING IS POSSIBLY INEFFECTIVE. THE RESULT IS NOT UNION-COMPATIBLE WITH ANY RELATION IN D |
| GROUP | $S^U \rightarrow S$ | THE GROUPING IS EFFECTIVE. THE RESULT IS UNION-COMPATIBLE WITH A RELATION IN D |
| | $S^U \rightarrow S^U$ | THE GROUPING IS POSSIBLY INEFFECTIVE. THE RESULT IS NOT UNION-COMPATIBLE WITH ANY RELATION IN D |
| SELECT | $D^+ \rightarrow D$ | THE OUTPUT ATTRIBUTE LIST IS NOT *. THE RESULT IS A COPY OF A RELATION IN D. |
| | $D^+ \rightarrow D^+$ | THE OUTPUT ATTRIBUTE LIST IS POSSIBLY *. THE RESULT IS UNION-COMPATIBLE WITH A RELATION IN D. |
| | $D^+ \rightarrow D^U$ | THE OUTPUT ATTRIBUTE LIST IS NOT *. NO VERTICAL PARTITION OF THE INPUT, AUGMENTED BY CONSTANTS AND AGGREGATES, IS UNION-COMPATIBLE WITH ANY RELATION IN D. |
| | $D^U \rightarrow D$ | THE OUTPUT ATTRIBUTE LIST IS NOT *. THE RESULT IS A COPY OF A RELATION IN D. |
| | $D^U \rightarrow D^+$ | THE OUTPUT ATTRIBUTE LIST IS NOT *. THE RESULT IS UNION-COMPATIBLE WITH A RELATION IN D. |
| | $D^U \rightarrow D^U$ | THE OUTPUT ATTRIBUTE LIST IS POSSIBLY *. THE RESULT IS NOT UNION-COMPATIBLE WITH ANY RELATION IN D. |
| SELECT | $S^U \rightarrow S$ | THE OUTPUT ATTRIBUTE LIST IS NOT *. THE RESULT IS UNION-COMPATIBLE WITH A RELATION IN D. |
| | $S^U \rightarrow S^U$ | THE OUTPUT ATTRIBUTE LIST IS POSSIBLY *. THE RESULT IS NOT UNION-COMPATIBLE WITH ANY RELATION IN D. |

SYSTEM AND METHOD FOR IMPROVED PROCESSING OF AN SQL QUERY MADE AGAINST A RELATIONAL DATABASE

Benefit is claimed under 35 U.S.C 119(a)-(d) to Indian Application Serial Number 1158/CHE/2012 entitled "SYSTEM AND METHOD FOR IMPROVED PROCESSING OF AN SQL QUERY MADE AGAINST A RELATIONAL DATABASE" by Wipro Limited filed on Mar. 27, 2012.

TECHNICAL FIELD

The present invention relates generally to database management, and more particularly to an SQL (structured query language) query made against a relational database.

BACKGROUND

Generally, an SQL (structured query language) query processor in a relational database management system (RDBMS) processes an SQL query by using a composition of universal parameterized functions to implement different clauses of the SQL query, which are essentially operators such as, FROM (F), WHERE (W), GROUP BY (G) and SELECT (L). Further, the universal parameterized functions take input parameters based on their implementation. For example, the universal parameterized function corresponding to the F operator takes an array of relations as input parameter and the universal parameterized function corresponding to the W operator takes a relation and a filter condition as input parameters.

Existing SQL query processors model the F, W, G and L operators such that a single universal parameterized function can support any set of input parameters used with its corresponding SQL clauses. For example, the same W operator can be used with any filter condition such as, a>5, a<4 and so on, over any relational database. Thus, the universal parameterized functions are context independent. They are implementation friendly and promote code reuse, but they are not congruent with formal closure, a fundamental property of SQL queries or of relational data under SQL queries. As a result, using universal parameterized functions does not aid formal verification of SQL queries. The incongruence of the universal parameterized functions with formal closure property results in inefficient traceability of the SQL queries. Also, the above described SQL query process does not provide type safety over the input parameters and output.

SUMMARY

A system and method for improved processing of an SQL query made against a relational database is disclosed. In accordance with one aspect of the present invention, the SQL query made against the relational database is received. Further, the received SQL query is parsed to obtain each operator and associated one or more operands and sequence of execution of the operators. Furthermore, it is determined whether all needed closure-friendly operators exist. In addition, any available closure-friendly operators are obtained from a pattern repository if all needed closure-friendly operators do not exist. Also, remaining or all non-available closure-friendly operators are dynamically generated. Moreover, the available closure-friendly operators and the dynamically generated closure-friendly operators are grouped into one or more patterns.

Further, one or more patterns are obtained from the pattern repository if all needed closure-friendly operators exist. Furthermore, impact of each pattern on a queried relational database and a database schema is classified. In addition, the SQL query is executed using the one or more patterns based on sequence of the execution of the operators. The one or more patterns including the dynamically generated closure-friendly operators are then stored in the pattern repository. Moreover, the received SQL query is analyzed using partitions of the closure-friendly operators. Also, the received SQL query is traced/debugged based on the analysis.

According to another aspect of the present subject matter, a non-transitory computer-readable storage medium for processing the SQL query made against the relational database, having instructions that, when executed by a computing device causes the computing device to perform the method described above.

According to yet another aspect of the present invention, a system for processing the SQL query made against the relational database includes one or more clients, a network and a relational database. Further, a computer is coupled to the one or more clients and the relational database via the network. Furthermore, the computer includes a processor and memory. The memory is operatively coupled to the processor. In addition, the computer includes a database management system including a closure-friendly SQL query processor residing in the memory. In one embodiment, the closure-friendly SQL query processor performs the method described above.

The methods and systems disclosed herein may be implemented in any means or combination of means for achieving various aspects, and other features will be apparent from the accompanying drawings and from the detailed description that follows.

BRIEF DESCRIPTION OF THE DRAWINGS

Various embodiments are described herein with reference to the drawings, wherein:

FIG. 2 is an exemplary pseudo-code illustrating dynamically generated closure-friendly operators for an SQL query, according to one embodiment;

FIG. 6 is a table illustrating operator patterns over the database D and its database schema S, according to one embodiment;

FIG. 7 is a table illustrating extended operator patterns over a database $D^U$, a database $D^+$ and a database schema $S^U$, according to one embodiment.

DETAILED DESCRIPTION

A system and method for improved processing of an SQL query made against a relational database is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The terms "operator" and "function" are used interchangeably throughout the document.

Figure 1:
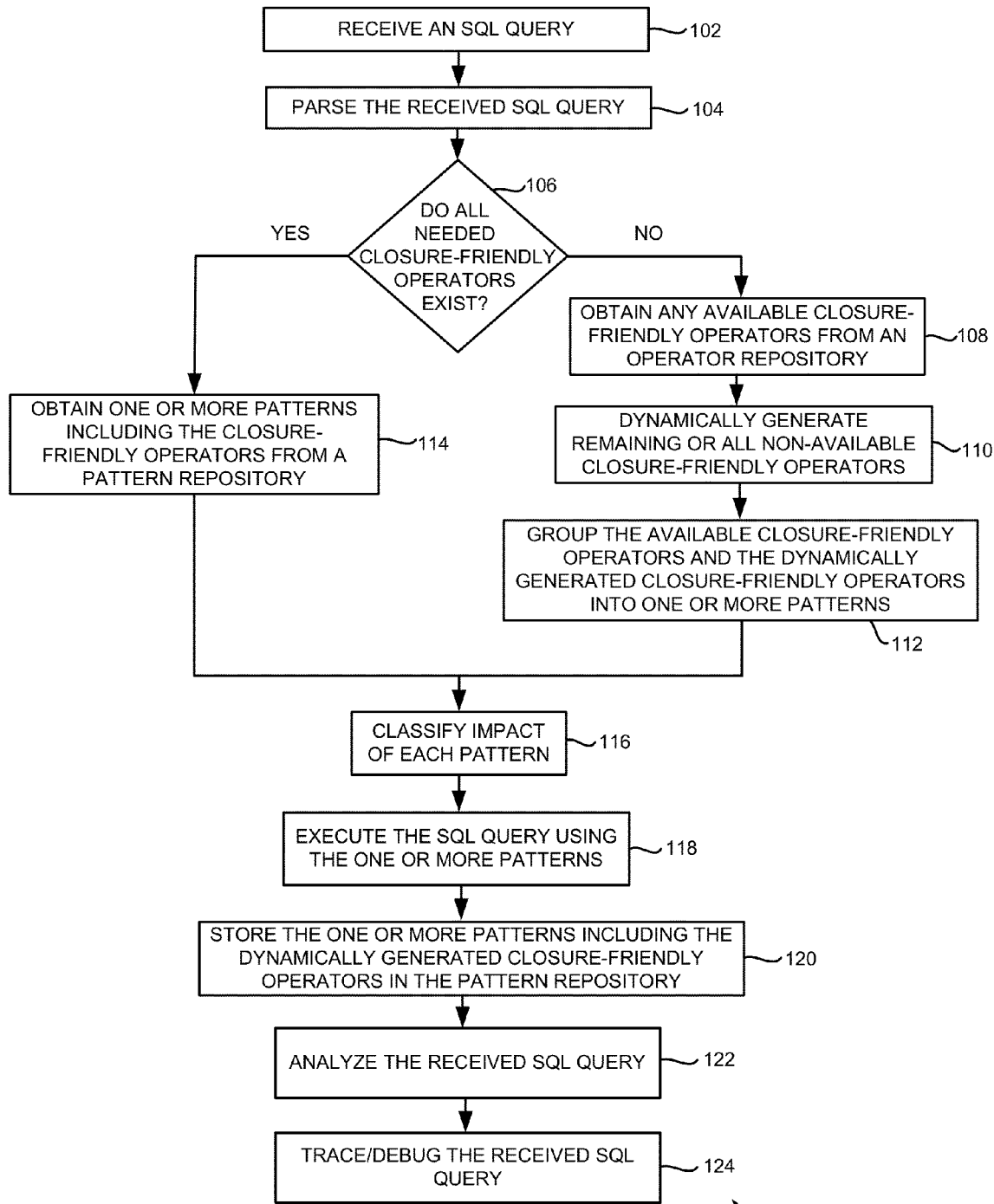
FIG. 1 illustrates a process flow of a method for improved processing of an SQL query made against a relational database, according to one embodiment.

FIG. 1 illustrates a flow diagram 100 of an exemplary computer-implemented method for improved processing of an SQL query made against a relational database, according to one embodiment. At block 102, the SQL query made against the relational database is received. At block 104, the received SQL query is parsed to obtain each operator and associated one or more operands and sequence of execution of the operators. Exemplary operators include FROM (F), WHERE (W), GROUP BY (G), SELECT (L) and the like. Exemplary operands include parameters such as filter criteria, tables and the like. Generally, F, W, G and L operators are executed in the aforesaid sequence. In this embodiment, each of the F, W, G and L operator is treated as a potentially distinct operator. Also in this embodiment, each SQL query $Q_s$ which is part of a complex query $Q_P$ is treated as a potentially distinct operator. For example, $Q_P$ can be "Select A From R1 Where A In $(Q_s)$"; where $Q_s$ can be "Select A From R2".

At block 106, it is determined whether all needed closure-friendly operators exist. At block 108, any available closure-friendly operators are obtained from a pattern repository if all needed closure-friendly operators do not exist. At block 110, remaining or all non-available closure-friendly operators are dynamically generated. This is explained in more detail with reference to FIG. 2. Exemplary pseudo-codes for possible dynamically generated closure-friendly operators for queries Q1 "SELECT A FROM R WHERE A>5" and Q2 "SELECT A, B FROM R1, R2 WHERE A>B" are included in Appendix "A" and Appendix "B", respectively. In this embodiment, the dynamically generated closure-friendly operators aid closure of the relational database under SQL queries. This is explained in more detail with reference to FIGS. 3A, 4A and 5.

At block 112, the available closure-friendly operators and the dynamically generated closure-friendly operators are grouped into one or more patterns. At block 114, one or more patterns including the closure-friendly operators are obtained from the pattern repository, if all needed closure-friendly operators exist. At block 116, the impact of each pattern on the queried relational database and the database schema is classified. This is explained in more detail with reference to FIGS. 6 and 7.

At block 118, the SQL query is executed using the one or more patterns based on sequence of the execution of the operators. For example, an SQL query "SELECT*FROM R WHERE a>5" is executed by dynamically generating closure-friendly operators for the L, F and W operators with the associated operands "*", "R" and "a>5", respectively. Initially, the dynamically generated closure-friendly operator corresponding to the F operator computes a cross product of the relation R over the input and generates a table. Further, the dynamically generated closure-friendly operator corresponding to the W operator applies the operand "a>5", which is a filter criterion, to the table generated by the F operator and generates an intermediate table. Furthermore, the dynamically generated closure-friendly operator corresponding to the L operator generates a table which is the result of the SQL query.

In addition in this embodiment, the closure-friendly operator is dynamically generated for each operator and the associated one or more operands possibly using optimization techniques. Exemplary optimization techniques include just-in-time (JIT) compilation, code caching, code libraries, lazy evaluation and the like. The optimization techniques can also include traditional optimization techniques, such as join order, push selects down and the like. Further, the optimization techniques can be implemented using functional techniques, procedural techniques, object oriented techniques and so on. For example, the JIT compilation technique is used to dynamically generate native codes for the closure-friendly operators. Further, the dynamically generated closure-friendly operators are cached using the code caching technique for improved performance. Furthermore, the cached closure-friendly operators may be reused when executing the received SQL query which may benefit from the cached closure-friendly operators. In one embodiment, generics can be employed to ease the process of dynamically generating the closure-friendly operators and to obtain type safety.

Further as shown in FIG. 1, at block 120, the one or more patterns including the dynamically generated closure-friendly operators are stored in the pattern repository. At block 122, the received SQL query is analyzed using partitions of the closure-friendly operators. In one embodiment, the partitions are derived from associated one or more patterns. At block 124, the received SQL query is traced/debugged based on the analysis. The partitions and hence related patterns enable easy and efficient analysis, debugging, execution, and tracing of the SQL queries.

Now, referring to FIG. 2, an exemplary pseudo-code illustrates dynamically generated closure-friendly operators for an SQL query, according to one embodiment. Particularly, FIG. 2 illustrates relevant portions of the dynamically generated closure-friendly operators for an SQL query Q3 "SELECT A FROM R WHERE A>5". As shown in FIG. 2, Q3 includes clauses "SELECT A", "FROM R" and "WHERE A>5". The arrow 202, shown in FIG. 2, points to a portion of the pseudo-code dynamically generated for the operand "R" associated with the FROM operator in Q3. Further, the arrow 204, shown in FIG. 2, points to a portion of the pseudo-code dynamically generated for the operand "A>5" associated with the WHERE operator in Q3.

Figure 3A:
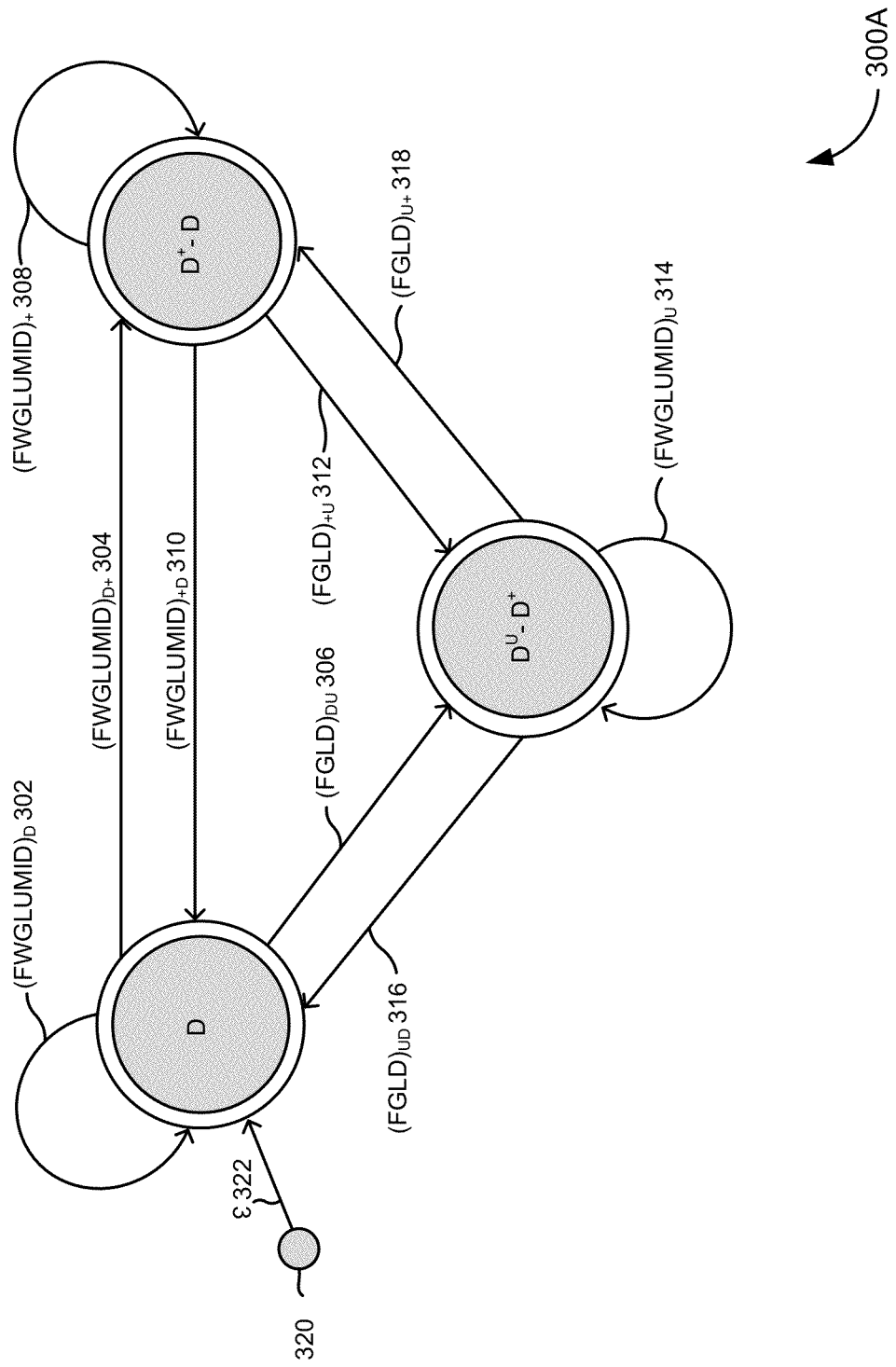
FIG. 3A is a state diagram illustrating an SQL query evaluated over a database D, according to one embodiment.

Now, referring to FIG. 3A, a state diagram 300A illustrates an SQL query evaluated over a database D, according to one embodiment. As shown, two additional databases, a database $D^+$ and a database $D^U$, are defined over the database D. The database $D^+$ includes every possible instance of the database D. Further, the database $D^+$ also includes a table without any rows. The database $D^U$ is a universal database which includes all possible databases that can be obtained in a typical SQL query.

Further as shown in FIG. 3A, the state diagram 300A includes three possible states. The possible states include a state D, a state ($D^+$-D) and a state ($D^U$-$D^+$). The state D includes the database D. The state ($D^+$-D) includes the database $D^+$ without any data contained in the database D. The state ($D^U$-$D^+$) includes the database $D^U$ without any data contained in the database D. Furthermore, the state diagram 300A is illustrated using unified modeling language (UML) syntax. As shown in FIG. 3A, 320 refers to a start state. In addition as shown in FIG. 3A, ∈ 322 represents a state transition from the start state 320 to the state D. However, while describing state transitions in the state diagram 300A, the state D is considered as the start state. Also, FIG. 3A illustrates state transitions corresponding to F, W, G, L, UNION (U), MINUS (M), INTERSECT (I) and DIVIDE (D) operators in the SQL query.

Figure 3B:
FIG. 3B illustrates a table including operator patterns over the database D, such as the one shown in FIG. 3A, according to one embodiment.

Referring now to FIG. 3B, a table 300B shows the state transitions corresponding to FWGL operators. Particularly, table 300B shows operator patterns over the database D. In table 300B, 'X' indicates an applicability of the operator pattern to a specific input-output combination. Also in table 300B, '-' indicates an inapplicability of the operator pattern to a specific input-output combination. In addition, the state transitions for U, M, and I operators are same as those for the W operator and the state transitions for the D operator are same as those for the L operator. The state transitions illustrated in the state diagram 300A are obtained using the table 300B.

Referring back to FIG. 3A, the operators causing the state transitions are labeled with one or two suffix characters to denote a source state and a destination state. The operators labeled with one suffix character indicate a transition from a state to itself. The operators labeled with two suffix characters indicate transition between distinct states.

Further as shown in FIG. 3A, a transition $(FWGLUMID)_D$ 302 represents the FWGLUMID operators that operate on data from the state D and produces a data in the state D. Further, a transition $(FWGLUMID)_{D+}$ 304 represents the FWGLUMID operators that operate on data from the state D and produces a data in the state ($D^+$-D). In addition, a transition $(FGLD)_{DU}$ 306 represents the FGLD operators that operate on data from the state D and produces a data in the state ($D^U$-$D^+$).

Furthermore as shown in FIG. 3A, a transition $(FWGLUMID)_+$ 308 represents the FWGLUMID operators that operates on data from the state ($D^+$-D) and produces a data in the state ($D^+$-D). In addition, a transition $(FWGLUMID)_{+D}$ 310 represents the FWGLUMID operators that operate on data from the state ($D^+$-D) and produces a data in the state D. Also, a transition $(FGLD)_{+U}$ 312 represents the FGLD operators that operate on data from the state ($D^+$-D) and produces a data in the state ($D^U$-$D^+$).

In addition as shown in FIG. 3A, a transition $(FWGLUMID)_U$ 314 represents the FWGLUMID operators that operate on data from the state ($D^U$-$D^+$) and produces a data in the state ($D^U$-$D^+$). Further, a transition $(FGLD)_{U+}$ 316 represents the FGLD operators that operate on data from the state ($D^U$-$D^+$) and produces a data in the state D. Furthermore, a transition $(FGLD)_{U+}$ 318 represents the FGLD operators that operate on data from the state ($D^U$-$D^+$) and produces a data in the state ($D^+$-D).

Also, the state diagram 300A is used to trace progression of the SQL query without having to the SQL query. For example, an SQL query Q4 "SELECT*FROM R" starts executing at the state D. As shown in FIG. 3A, F and L operators operating on data from the state D, produces a data in the state D. Thus, the state transitions for the SQL query Q4 are D, D and D. As a result, the SQL query Q4 starts executing from the state D and ends at the state D. However, it is not always possible to trace the data transitions for an SQL query without executing the SQL query. However, database schema transitions of the SQL query can be traced without having to execute the SQL query. This is explained in more detail with reference to FIGS. 4A and 4B.

Figure 4A:
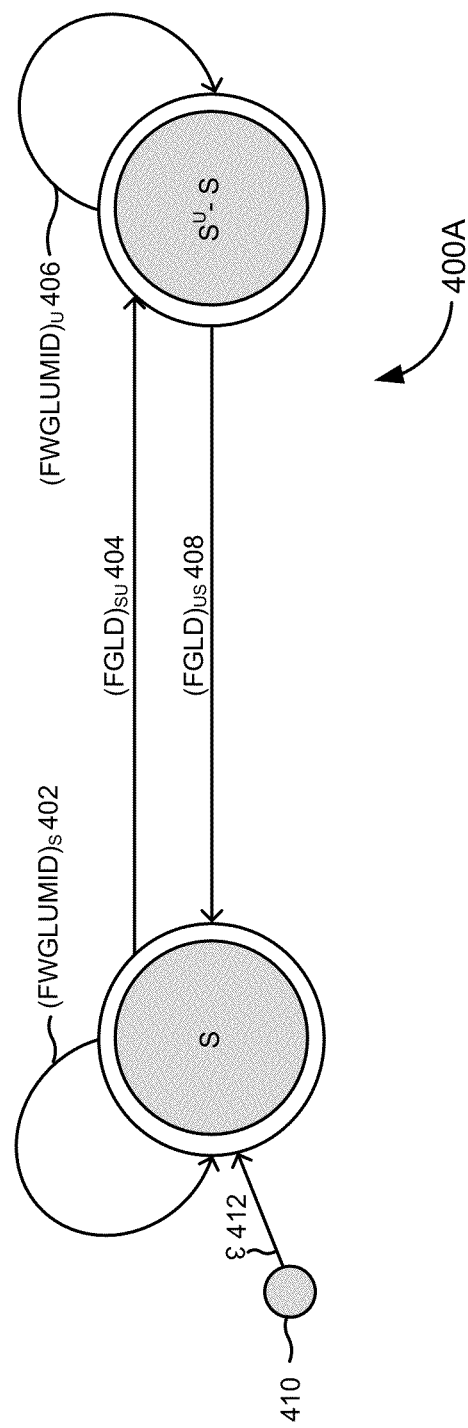
FIG. 4A is another state diagram illustrating an SQL query evaluated over a database schema S, according to one embodiment.

Now, referring to FIG. 4A, which illustrates another state diagram 400A of an SQL query evaluated over a database schema S, according to one embodiment. As shown, an additional database schema is defined over the database schema S. The additional database schema is a universal database schema $S^U$. $S^U$ includes all possible database schemas that can be obtained in a typical SQL query. Further as shown, the state diagram 400A includes two possible states, a state S and a state ($S^U$-S). The state S includes the database schema S and the state ($S^U$-S) includes the universal database schema $S^U$ without any schema contained in database schema S. Furthermore, as in state diagram 300A shown in FIG. 3A, the state diagram 400A is also illustrated using the UML syntax. As shown in FIG. 4A, 410 refers to a start state. In addition as shown in FIG. 4A, ∈ 412 represents a state transition from the start state 410 to the state S. However, while describing state transitions in the state diagram 400A, the state S is considered as the start state. Also, FIG. 4A illustrates the state transitions corresponding to F, W, G, L, U, M, I and D operators in the SQL query.

Figure 4B:
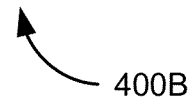
FIG. 4B illustrates a table including operator patterns over the database schema S, such as the one shown in FIG. 4A, according to one embodiment.

Referring now to FIG. 4B, a table 400B shows the state transitions corresponding to FWGL operators. Particularly, table 400B shows operator patterns over the database schema S. In table 400B, 'X' indicates the applicability of the operator pattern to the specific input-output combination. Also in table 400B, '-' indicates inapplicability of the operator pattern to the specific input-output combination. In addition, the state transitions for U, M, and I operators are same as those for W operator and the state transitions for the D operator are same as those for L operator. The state transitions illustrated in the state diagram 400A are obtained using the table 400B.

Referring back to FIG. 4A, the operators causing the state transitions are labeled with one or two suffix characters to denote a source state and a destination state. The operators labeled with one suffix character indicate a transition from a state to itself. The operators labeled with two suffix characters indicate transition between distinct states.

Further as shown in FIG. 4A, a transition $(FWGLUMID)_S$ 402 represents the FWGLUMID operators that operate on a database schema from the state S and produces a database schema in the state S. Furthermore, a transition $(FGLD)_{SU}$ 404 represents the FGLD operators that operate on a database schema from the state S and produces a database schema in the state ($S^U$-S).

In addition as shown in FIG. 4A, a transition $(FWGLUMID)_U$ 406 represents the FWGLUMID operators that operate on a database schema from the state ($S^U$-S) and produces a database schema in the state ($S^U$-S). Also, a transition $(FGLD)_{US}$ 408 represents the FGLD operators that operate on a database schema from the state ($S^U$-S) and produces a database schema in the state S.

Moreover, the state diagram 400A is used to trace progression of the SQL query. For example, the SQL query Q4 "SELECT*FROM R" starts executing at the state S. As shown in FIG. 4A, F and L operators operating on a database schema from the state S, produces a database schema in the state S. Thus, the state transitions for the SQL query Q4 are S, S and S. As a result, the SQL query Q4 starts executing from the state S and ends at the state S. In addition, the database schema transitions are used to obtain the possible data transitions for the SQL query. An exemplary procedure for obtaining possible data transitions for an SQL query from the database schema transitions is included in Appendix "C".

Figure 5:
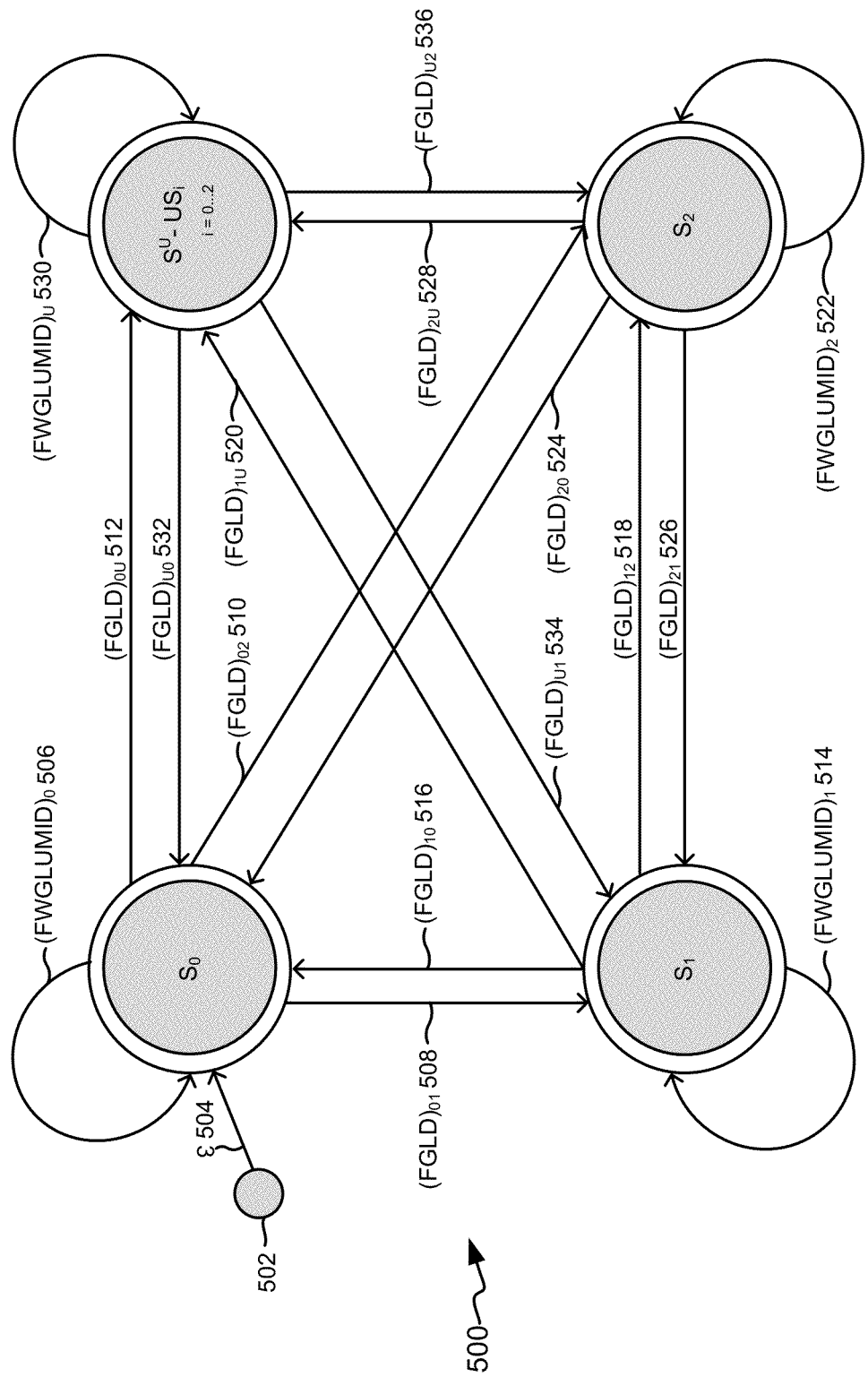
FIG. 5 is a generalized state diagram illustrating an SQL query evaluated over a set of database schemas, according to one embodiment.

Now, referring to FIG. 5, a generalized state diagram 500 illustrates an SQL query evaluated over a set of database schemas, according to one embodiment. As shown, the state diagram 500 is used to analyze, debug and trace SQL queries beyond closure. Further, the state diagram 500 illustrates state transitions over a set of database schemas $S_0$, $S_1$, $S_2$ and ($S^U$-$US_i$), where, i=0 . . . 2. The database schema ($S^U$-$US_i$) includes the universal database schema without any database schema contained in any of the database schemas $S_0$, $S_1$ and $S_2$. Furthermore, the state diagram 500 includes 4 possible states, a state $S_0$, a state $S_1$, a state $S_2$ and a state ($S^U$-$US_i$). In addition, the state diagram 500 partitions the FWGLUMID operators based on their ability to map results among the database schemas $S_0$, $S_1$, $S_2$ and ($S^U$-$US_i$).

Similar to state diagrams 300A and 400A in FIGS. 3A and 4A, the state diagram 500 is also based on UML syntax. As shown in FIG. 5, 502 refers to a start state. In addition as shown in FIG. 5, $\epsilon$ 504 represents a state transition from the start state 502 to the state $S_0$. However, while describing the state transitions in the state diagram 500, the state $S_0$ is considered as the start state. Also in the state diagram 500, the operators causing the state transitions are labeled with one or two suffix characters to denote a source state and a destination state. The operators labeled with one suffix character indicate a transition from a state to itself. The operators labeled with two suffix characters indicate transition between distinct states As shown in FIG. 5, a transition (FWGLUMID)$_0$ 506 represents the FWGLUMID operators that operate on a database schema from the state $S_0$ and produces a database schema in the state $S_0$. Further, a transition (FGLD)$_{01}$ 508 represents the FGLD operators that operate on a database schema from the state $S_0$ and produces a database schema in the state $S_1$. Furthermore, a transition (FGLD)$_{02}$ 510 represents the FGLD operators that operate on a database schema from the state $S_0$ and produces a database schema in the state $S_2$. In addition, a transition (FGLD)$_{0U}$ 512 represents the FGLD operators that operate on a database schema from the state $S_0$ and produce a database schema in the state ($S^U$-$US_i$).

Further as shown in FIG. 5, a transition (FWGLUMID)$_1$ 514 represents the FWGLUMID operators that operate on a database schema from the state $S_1$ and produces a database schema in the state $S_1$. Furthermore, a transition (FGLD)$_{10}$ 516 represents the FGLD operators that operate on a database schema from the state $S_1$ and produces a database schema in the state $S_0$. In addition, a transition (FGLD)$_{12}$ 518 represents the FGLD operators that operate on a database schema from the state $S_1$ and produces a database schema in the state $S_2$. Also, a transition (FGLD)$_{1U}$ 520 represents the FGLD operators that operate on a database schema from the state $S_1$ and produce a database schema in the state ($S^U$-$US_i$).

Furthermore as shown in FIG. 5, a transition (FWGLUMID)$_2$ 522 represents the FWGLUMID operators that operate on a database schema from the state $S_2$ and produces a database schema in the state $S_2$. In addition, a transition (FGLD)$_{20}$ 524 represents the FGLD operators that operate on a database schema from the state $S_2$ and produces a database schema in the state $S_0$. Also, a transition (FGLD)$_{21}$ 526 represents the FGLD operators that operate on a database schema from the state $S_2$ and produces a database schema in the state $S_1$. Moreover, a transition (FGLD)$_{2U}$ 528 represents the FGLD operators that operate on a database schema from the state $S_2$ and produce a database schema in the state ($S^U$-$US_i$).

In addition as shown in FIG. 5, a transition (FWGLUMID)$_U$ 530 represents the FWGLUMID operators that operate on a database schema from the state ($S^U$-$US_i$) and produces a database schema in the state ($S^U$-$US_i$). Further, a transition (FGLD)$_{U0}$ 532 represents the FGLD operators that operate on a database schema from the state ($S^U$-$US_i$) and produces a database schema in the state $S_0$. Furthermore, a transition (FGLD)$_{U1}$ 534 represents the FGLD operators that operate on a database schema from the state ($S^U$-$US_i$) and produces a database schema in the state $S_1$. Also, a transition (FGLD)$_{U2}$ 536 represents the FGLD operators that operate on a database schema from the state ($S^U$-$US_i$) and produces a database schema in the state $S_2$.

Referring now to FIG. 6, a table 600 illustrates operator patterns over the database D and the database schema S, according to one embodiment. In table 600, the database $D^+$ excludes the database D, the database $D^U$ excludes the database $D^+$ and the database schema $S^U$ excludes the database schema S. As shown in table 600, column 602 includes the operators used in an SQL query and column 604 includes different operator patterns for each operator in column 602. Further, column 606 shows whether the database D and the database schema S is closed under each operator pattern in column 604. Also, column 608 shows remarks for each operator pattern in column 604. For example, the first row in table 600 illustrates that the database D is closed under the FROM operator when the input contains only one relation.

Referring now to FIG. 7, a table 700 illustrates extended operator patterns over the database $D^U$, the database $D^+$ and the database schema $S^U$, according to one embodiment. As shown in table 700, the database $D^+$ excludes the database D, the database $D^U$ excludes the database $D^+$ and the database schema $S^U$ excludes the database schema S. Further as shown in table 700, column 702 includes the operators used in an SQL query and column 704 includes different operator patterns for each operator in column 702. Furthermore as shown in table 700, column 706 shows remarks for each operator pattern in column 704. For example, the first row in table 700 illustrates that the FROM operator operated on data from database $D^+$ produces data in database D when the input has more than one relation.

Figure 8:
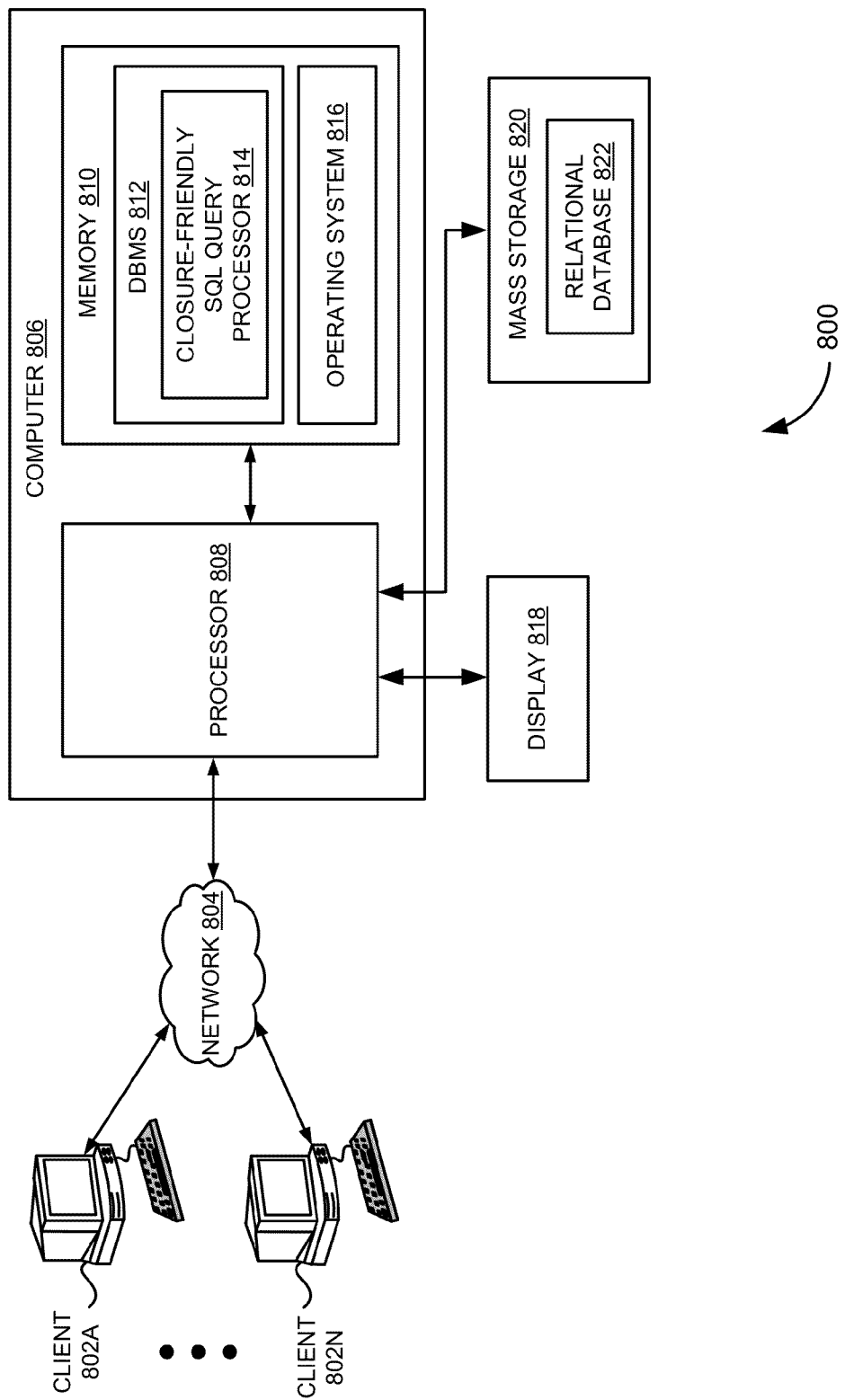
FIG. 8 illustrates a block diagram of a networked computer system incorporating a database management system for improved processing of an SQL query made against the relational database, such as those shown in FIG. 1, according to one embodiment.

Now, referring to FIG. 8, a block diagram of a networked computer system 800 incorporating a database management system (DBMS) 812 is illustrated, according to one embodiment. As shown in FIG. 8, the networked computer system 800 includes one or more clients 802A-N, a network 804, a computer 806, a display 818 and a mass storage 820. Further as shown in FIG. 8, the mass storage 820 includes a relational database 822. In this embodiment, the computer 806 is coupled to the clients 802A-N and the relational database 822 via the network 804. Furthermore as shown in FIG. 8, the computer 806 includes a processor 808 operatively coupled to memory 810. In addition as shown in FIG. 8, the memory 810 includes the DBMS 812 and an operating system 816. The DBMS 812 further includes a closure-friendly SQL query processor 814 residing in the memory 810.

In operation, the closure-friendly SQL query processor 814 receives an SQL query made against the relational database 822 from one or more clients 802A-N via the network 804. Further, the closure-friendly SQL query processor 814 parses the received SQL query to obtain each operator and associated one or more operands and sequence of execution of the operators. Furthermore, the closure-friendly SQL query processor 814 determines whether all needed closure-friendly operators exist. In addition, the closure-friendly SQL query processor 814 obtains any available closure-friendly operators from a pattern repository if all needed closure-friendly operators do not exist. Moreover, the closure-friendly SQL query processor 814 dynamically generates remaining or all non-available closure-friendly operators.

This is explained in detail with reference to FIG. 2. Also, the closure-friendly SQL query processor 814 groups the available closure-friendly operators and dynamically generated closure-friendly operators into one or more patterns.

In this embodiment, the closure-friendly SQL query processor 814 dynamically generates the closure-friendly operator for each operator and the associated one or more operands possibly using optimization techniques. Exemplary optimization techniques include just-in-time compilation, code caching, code libraries, lazy evaluation and the like. This is explained in more detail with reference to FIG. 1.

Further, the closure-friendly SQL query processor 814 obtains one or more patterns including the closure-friendly operators from the pattern repository if all needed closure-friendly operators exist. Furthermore, the closure-friendly SQL query processor 814 classifies impact of each pattern on a queried relational database and a database schema. This is explained in detail with reference to FIGS. 6 and 7. In addition, the closure-friendly SQL query processor 814 executes the received SQL query using the one or more patterns based on sequence of the execution of the operators. Also, the received SQL query is analyzed by the closure-friendly SQL query processor 814 using partitions of the closure-friendly operators. Moreover, the received SQL query is traced/debugged, by the closure-friendly SQL query processor 814, based on the analysis.

In various embodiments, the methods and systems described in FIGS. 1 through 8 proposes a closure-friendly SQL query processor which is closer to formalism and easily verifiable. The closure-friendly operators generated by the closure-friendly SQL query processor allow the relational databases to be closed under a SQL query. Also, the closure-friendly operators aid analysis, debugging and tracing of the SQL query. In addition, the closure-friendly SQL query processor restores the ability to perform mathematical analysis in the implementation.

Although the present embodiments have been described with reference to specific example embodiments, it will be evident that various modifications and changes may be made to these embodiments without departing from the broader scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structures and methods may be embodied using transistors, logic gates, and electrical circuits, such as an application specific integrated circuit.

APPENDIX "A"

//Functions specific to Query Q1 Q1 "SELECT A FROM R WHERE A>5"
Relation Q1_F (Relation[ ] relations)
//this function can be optimized away
return relations[0]
Relation Q1_W (Relation R)
Relation result ← Empty instance of Schema (R)
for each Row r in R
    if r[A] > 5
        Add r to result
return result
Relation Q1_L (Relation R)
Relation result ← Empty
//create result schema
Add schema of R["A"] to Schema(result)
//add rows to result relation APPENDIX "A"-continued for each Row r in R
    Row r' ← Empty
    r'["A"] ← r["A"]
    Add r' to result
return result

APPENDIX "B"

//Functions specific to Q2
Relation Q2_F (Relation[ ] relations)
//as written, this function is not query-specific
//but it can be made more specific by exploiting
//the schema and bindings of the input relations
return relations[0] * relations[1]
Relation Q2_W (Relation R)
Relation result ← Empty instance of Schema(R)
for each Row r in R
    if r[A] > r[B]
        Add r to result
return result
Relation Q2_L (Relation R)
Relation result ← Empty
//create result schema
Add schema of R["A"] to Schema(result)
Add schema of R["B"] to Schema(result)
//add rows to result relation
for each Row r in R
    Row r' ← Empty
    r'["A"] ← r["A"]
    r'["B"] ← r["B"]
    Add r' to result
return result

APPENDIX "C"

SchemaStateAndDataStates (Database D, Operator θ)
S ← Schema(D)
s' ← schema of the result of θ over D
if s' ε S, schema state is S, possible data states are D and D+
else schema state is $S^U$, data state is $D^U$.

What is claimed is:

1. A method for improved processing of structured query language (SQL) queries, the method comprising:

parsing, with a query processing computing device, a received SQL query made against a relational database to obtain one or more operators and associated one or more operands and a sequence of execution of the operators;

identifying, with the query processing computing device, one or more required closure-friendly operators based on the one or more operators obtained from the SQL query and determining whether each of the closure-friendly operators exist;

obtaining, with the query processing computing device, any of the closure-friendly operators determined to exist from a pattern repository;

dynamically generating, with the query processing computing device, any of the closure-friendly operators determined not to exist;

grouping, with the query processing computing device, the obtained closure-friendly operators and the dynamically generated closure-friendly operators into one or more patterns;

classifying, with the query processing computing device, an impact of each of the patterns on at least one of the relational database or a database schema of the relational database; and executing, with the query processing computing device, the SQL query using the patterns based on the sequence of the execution of the operators.

2. The method of claim 1, wherein the any of the closure-friendly operators determined not to exist are dynamically generated using one or more optimization techniques.

3. The method of claim 2, wherein the one or more optimization techniques comprise just-in-time compilation, code caching, code libraries, or lazy evaluation.

4. The method of claim 1, further comprising storing, with the query processing computing device, the one or more patterns including the dynamically generated closure-friendly operators in the pattern repository.

5. The method of claim 1, further comprising:
analyzing, with the query processing computing device, the SQL query using partitions of the required closure-friendly operators; and
tracing/debugging, with the query processing computing device, the SQL query based on the analysis.

6. A query processing system, comprising:
a processor coupled to a memory and configured to execute programmed instructions stored in the memory, comprising:
parsing a received SQL query made against a relational database to obtain one or more operators and associated one or more operands and a sequence of execution of the operators;
identifying one or more required closure-friendly operators based on the one or more operators obtained from the SQL query and determining whether each of the closure-friendly operators exist;
obtaining any of the closure-friendly operators determined to exist from a pattern repository;
dynamically generating any of the closure-friendly operators determined not to exist;
grouping the obtained closure-friendly operators and the dynamically generated closure-friendly operators into one or more patterns;
classifying an impact of each of the patterns on at least one of the relational database or a database schema of the relational database; and
executing the SQL query using the patterns based on the sequence of the execution of the operators.

7. The system of claim 6, wherein the any of the closure-friendly operators determined not to exist are dynamically generated using one or more optimization techniques.

8. The system of claim 7, wherein the one or more optimization techniques comprise just-in-time compilation, code caching, code libraries, or lazy evaluation.

9. The system of claim 6, wherein the processor coupled to a memory is further configured to execute programmed instructions stored in the memory further comprising storing the one or more patterns including the dynamically generated closure-friendly operators in the pattern repository.

10. The system of claim 6, wherein the processor coupled to a memory is further configured to execute programmed instructions stored in the memory further comprising:
analyzing the SQL query using partitions of the required closure-friendly operators; and
tracing/debugging the SQL query based on the analysis.

11. A non-transitory computer-readable medium for improved processing of structured query language (SQL) queries having instructions that, when executed by a computing device cause the computing device to:
parse a received SQL query made against a relational database to obtain one or more operators and associated one or more operands and a sequence of execution of the operators;
identify one or more required closure-friendly operators based on the one or more operators obtained from the SQL query and determine whether each of the closure-friendly operators exist;
obtain any of the closure-friendly operators determined to exist from a pattern repository;
dynamically generate any of the closure-friendly operators determined not to exist;
group the obtained closure-friendly operators and the dynamically generated closure-friendly operators into one or more patterns;
classify an impact of each of the patterns on at least one of the relational database or a database schema of the relational database; and
execute the SQL query using the patterns based on the sequence of the execution of the operators.

12. The medium of claim 11, wherein the any of the closure-friendly operators determined not to exist are dynamically generated using one or more optimization techniques.

13. The medium of claim 12, wherein the one or more optimization techniques comprise just-in-time compilation, code caching, code libraries, or lazy evaluation.

14. The medium of claim 11, further having instructions that, when executed by the computing device further cause the computing device to store the one or more patterns including the dynamically generated closure-friendly operators in the pattern repository.

15. The medium of claim 11, further having instructions that, when executed by the computing device further cause the computing device to:
analyze the received SQL query using partitions of the required closure-friendly operators; and
trace/debug the SQL query based on the analysis.

* * * * *